United States Patent
Sun

(10) Patent No.: US 11,455,510 B2
(45) Date of Patent: Sep. 27, 2022

(54) VIRTUAL-LIFE-BASED HUMAN-MACHINE INTERACTION METHODS, APPARATUSES, AND ELECTRONIC DEVICES

(71) Applicant: ALIPAY (HANGZHOU) INFORMATION TECHNOLOGY CO., LTD., Zhejiang (CN)

(72) Inventor: Jinhui Sun, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/361,117

(22) Filed: Jun. 28, 2021

(65) Prior Publication Data
US 2022/0092378 A1 Mar. 24, 2022

(30) Foreign Application Priority Data

Sep. 23, 2020 (CN) .......................... 202011009260.7

(51) Int. Cl.
| | | |
|---|---|---|
| *G06N 3/00* | (2006.01) | |
| *B25J 11/00* | (2006.01) | |
| *G06T 13/40* | (2011.01) | |
| *G10L 13/02* | (2013.01) | |

(52) U.S. Cl.
CPC ............ *G06N 3/006* (2013.01); *B25J 11/001* (2013.01); *G06T 13/40* (2013.01); *G10L 13/02* (2013.01)

(58) Field of Classification Search
None
See application file for complete search history.

(56) References Cited

U.S. PATENT DOCUMENTS

| | | | |
|---|---|---|---|
| 10,762,414 B1* | 9/2020 | Marggraff | G06N 3/008 |
| 2010/0250196 A1* | 9/2010 | Lawler | G06N 3/006 |
| | | | 715/706 |
| 2017/0193280 A1* | 7/2017 | Huang | G06T 13/40 |
| 2018/0133900 A1* | 5/2018 | Breazeal | B25J 19/026 |
| 2018/0204107 A1* | 7/2018 | Tucker | G06F 16/24573 |
| 2019/0095775 A1* | 3/2019 | Lembersky | G06N 20/00 |
| 2019/0147347 A1* | 5/2019 | Ng | G06F 9/46 |
| | | | 706/46 |
| 2019/0283257 A1* | 9/2019 | Iyengar | G06F 3/167 |

(Continued)

OTHER PUBLICATIONS

Erol et al., "Toward Artificial Emotional Intelligence for Cooperative Social Human-Machine Interaction", Jun. 24, 2019 (Year: 2019).*

(Continued)

*Primary Examiner* — Hilina K Demeter
(74) *Attorney, Agent, or Firm* — Fish & Richardson P.C.

(57) ABSTRACT

Disclosed herein are methods, systems, and apparatus, including computer programs encoded on computer storage media, for virtual-life-based human-machine interaction. One of the method includes obtaining cognitive data for a target user in response to a human-machine interaction from the target user by performing perception analysis on the target user. Target response content is identified based on the cognitive data and sent to the target user. A virtual interactive animation that comprises a virtual life image is dynamically generated based on the cognitive data and the target response content, where the virtual life image has an animation effect that matches the human-machine interaction performed by the target user.

15 Claims, 3 Drawing Sheets

Hi, I am a customer service robot.
What can I do for you?

• How to modify account information

• My discount card

• Complaint channel

• Transfer to manual service

Input content

(56) References Cited

U.S. PATENT DOCUMENTS

| | | | | |
|---|---|---|---|---|
| 2019/0358425 A1* | 11/2019 | Li | ............................ | G16H 20/70 |
| 2020/0226483 A1* | 7/2020 | Bellamy | ................. | G16H 50/20 |
| 2020/0234181 A1* | 7/2020 | Katz | ....................... | G06N 20/00 |
| 2021/0004680 A1* | 1/2021 | Publicover | .............. | G06V 20/30 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

VIRTUAL-LIFE-BASED HUMAN-MACHINE INTERACTION METHODS, APPARATUSES, AND ELECTRONIC DEVICES

CROSS-REFERENCE TO RELATED APPLICATIONS

This application claims priority to Chinese Patent Application No. 202011009260.7, filed on Sep. 23, 2020, which is hereby incorporated by reference in its entirety.

TECHNICAL FIELD

This document relates to the field of artificial intelligence technologies, and in particular, to virtual-life-based human-machine interaction methods, apparatuses, and electronic devices.

BACKGROUND

With the development of artificial intelligence technologies, virtual robots are increasingly and widely applied to human-machine interaction. Currently, a main working principle of the virtual robot is to respond to users by matching question content of the users with predetermined answer content. In this interaction mode, a mechanical response is made, and there is a lack of user-friendliness and interactivity, resulting in poor user experience.

Currently, users make higher requirements on human-machine interaction, and therefore a virtual-life-based human-machine interaction solution needs to be provided.

SUMMARY

Embodiments of the present specification intend to provide virtual-life-based human-machine interaction methods, apparatuses, and electronic devices, so that a virtual robot can implement a more real and natural human-machine interaction.

To achieve the previous objective, the embodiments of the present specification are implemented as follows:

According to a first aspect, a virtual-life-based human-machine interaction method is provided, and includes the following:

Input data for performing a human-machine interaction by a target user is obtained; response content determined based on the input data is output to the target user; and a virtual interactive animation that matches the response content is output to the target user, where the virtual interactive animation is used to direct the human-machine interaction.

According to a second aspect, a virtual-life-based human-machine interaction apparatus is provided, and includes: a cognitive module, configured to perform perception analysis on a target user who performs a human-machine interaction, to obtain cognitive data for the target user; an output module, configured to output target response content determined based on the cognitive data to the target user; and a presentation module, configured to play a virtual interactive animation that includes a virtual life image and is dynamically generated based on the cognitive data and the target response content, where the virtual life image in the virtual interactive animation has an animation effect that matches the human-machine interaction performed with the target user.

According to a third aspect, an electronic device is provided, and includes a memory, a processor, and a computer program that is stored in the memory and can run on the processor. The computer program is executed by the processor to perform the following operations: performing perception analysis on a target user who performs a human-machine interaction, to obtain cognitive data for the target user; outputting target response content determined based on the cognitive data to the target user; and playing a virtual interactive animation that includes a virtual life image and is dynamically generated based on the cognitive data and the target response content, where the virtual life image in the virtual interactive animation has an animation effect that matches the human-machine interaction performed with the target user.

According to a fourth aspect, a computer-readable storage medium is provided. The computer-readable storage medium stores a computer program, and when the computer program is executed by a processor, the following steps are implemented: performing perception analysis on a target user who performs a human-machine interaction, to obtain cognitive data for the target user; outputting target response content determined based on the cognitive data to the target user; and playing a virtual interactive animation that includes a virtual life image and is dynamically generated based on the cognitive data and the target response content, where the virtual life image in the virtual interactive animation has an animation effect that matches the human-machine interaction performed with the target user.

In the solution of the embodiments of the present specification, perception analysis is performed on a user in a human-machine interaction process, to obtain cognitive data for the user, and response content for the user is further based on the cognitive data. In addition, a virtual interactive animation that includes a virtual life image is dynamically generated based on the cognitive data and the response content for the user, to assist in human-machine interaction. The entire solution enalblesa virtual robot to acquire the capability of perception, reasoning and analysis, cognition, and empathy expression, to implement a more real and natural human-machine interaction. As such, better user experience can be achieved.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description are merely some of the embodiments described in the present specification. A person of ordinary skill in the art can further derive other drawings from these accompanying drawings without creative efforts.

DESCRIPTION OF EMBODIMENTS

To make a person skilled in the art better understand the technical solutions in the present specification, the following clearly and comprehensively describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present specification.

As described above, currently, a main working principle of a virtual robot is to respond to users by matching question content of the users with predetermined answer content. In this interaction mode, a mechanical response is made, and there is a lack of user-friendliness and interactivity, resulting in poor user experience. For users, the virtual robot is expected to have real vitality, for example, can express empathy in an interaction process. Therefore, this document intends to provide a virtual-life-based human-machine interaction solution.

Figure 1:
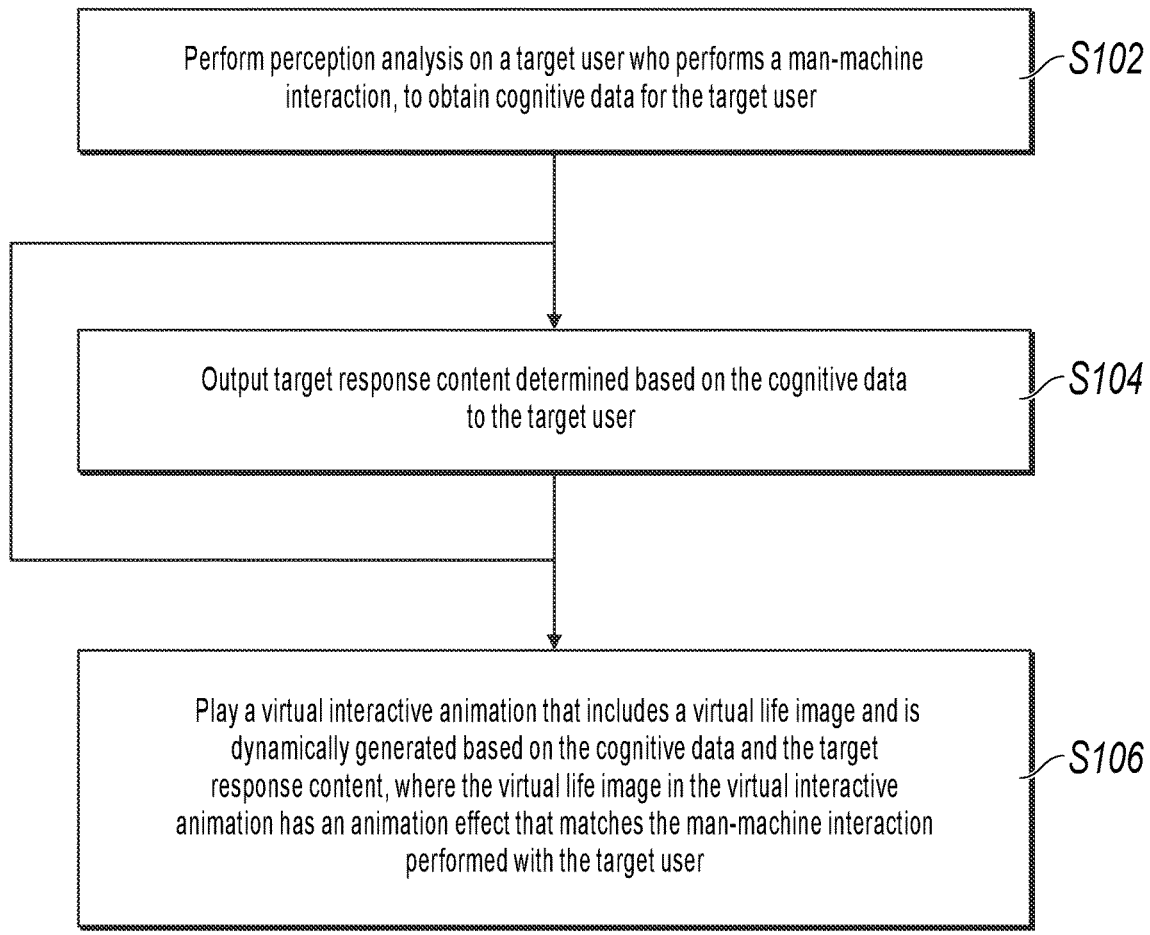
FIG. 1 is a schematic flowchart illustrating an example of a human-machine interaction method, according to some embodiments of the present specification.

FIG. 1 is a flowchart illustrating an example of a virtual-life-based human-machine interaction method, according to some embodiments of the present specification. The method shown in FIG. 1 can be performed by the following corresponding apparatus, and includes the following steps:

S102. Perform perception analysis on a target user who performs a human-machine interaction, to obtain cognitive data for the target user.

Specifically, in the embodiments of the present specification, perception analysis of at least two types of modal information can be performed on the target user, to obtain cognitive data about the at least two types of modal information for the target user. As an example, the perception analysis can specifically include:

perception analysis based on visual information. For example, information at the sight of the target user on a human-machine interaction interface is perceived, and question content of the target user is predicted and analyzed. For another example, facial features of the target user are perceived, to analyze an emotion of the target user based on the facial features.

As an example, the perception analysis can specifically include perception analysis based on auditory information. For example, input data for performing the human-machine interaction in a voice mode by the target user is perceived, and semantic analysis is performed on the input data, to extract the question content of the target user. For another example, voiceprint features for performing the human-machine interaction of the target user are perceived, to analyze the emotion of the target user based on the voiceprint features.

As an example, the perception analysis can specifically include perception analysis based on human-machine interaction input information. For example, text information input by the target user on the human-machine interaction interface is perceived, and the text information is analyzed, to extract the question content of the target user.

It can be seen that in the embodiments of the present specification, a virtual robot has a powerful capability of perceiving visual information, auditory information, text, etc., and therefore can perform interaction-related analysis on the target user based on the perceived modal information, to determine data, namely, the cognitive data that is useful for the human-machine interaction of the target user.

S104. Output target response content determined based on the cognitive data to the target user.

It should be understood that the target response content is content fed back by the virtual robot to the target user in the human-machine interaction process. In the embodiments of the present specification, the target response content can be output by using a plurality of methods. For example, the target response content can be output through an image or through audio. Here, implementations are not specifically limited in the present specification.

S106. Play a virtual interactive animation that includes a virtual life image and is dynamically generated based on the cognitive data and the target response content, where the virtual life image in the virtual interactive animation has an animation effect that matches the human-machine interaction performed with the target user.

It should be understood that in the embodiments of the present specification, the virtual interactive animation can assist in the human-machine interaction. Here, implementations are not specifically limited in the present specification as there are a plurality of specific expression methods. In addition, the virtual life image in the virtual interactive animation can be but is not limited to a personified image, a materialized image, or a created non-natural image.

In the embodiments of the present specification, the virtual life image can make body movements, expressions, etc. that match the response content. For example, if the input data of the target user includes complaint content, the virtual interactive animation can be a personified apology action and a personified apology expression.

Specifically, in the method in the embodiments of the present specification, the virtual interactive animation can be created by using the following steps:

S1061. Generate a basic virtual interactive animation based on the target response content, where the basic virtual interactive animation includes a virtual life image that has a basic animation effect.

Here, in the embodiments of the present specification, a mapping relationship between a plurality of types of response content and basic virtual interactive animations can be predetermined. After the input data for performing the human-machine interaction by the target user is obtained, input content of the target user can be extracted from the input data, and the corresponding basic virtual interactive animation can be matched from the pre-stored mapping relationship.

In addition, to achieve a deeper reasoning, association, and memory capability in the human-machine interaction, the basic virtual interactive animation can be generated by using a deep learning technology. That is, in this step, feature extraction is performed on the target response content based on at least one feature dimension (for example, a service type feature dimension and a question content type feature dimension involved in the interaction) predetermined for making a response to a user, to obtain a response feature of the target response content. The obtained response feature of the target response content is input to a predetermined basic virtual image generation model, to obtain the basic virtual interactive animation.

The basic virtual image generation model is obtained through training based on a response feature in sample response content and a basic animation effect of a virtual life image marked by using the sample response content (the response feature in the sample response content has the same feature dimension as the response feature extracted from the target response content), and has a function of associating the input response content with the basic animation effect and categorizing the input response content and the basic animation effect.

In practice, the virtual life image can include basic virtual interactive animations of a plurality of parts. The basic virtual interactive animation of each part can correspond to at least one basic virtual image generation model responsible for rendering the animation effect.

S1062. Generate an additional virtual interactive animation based on the cognitive data for the target user, where the additional virtual interactive animation includes a virtual life image that has an additional animation effect.

In the embodiments of the present specification, the additional virtual interactive animation is used to improve an empathy capability to make an animation response to the target user.

Specifically, in the perception analysis on the target user, the cognitive data can include a first emotional indicator that reflects the emotion of the targer user.

For example, when the target user inputs interactive content in a text format in performing the human-machine interaction, or when interactive content is converted into a text format, the first emotional indicator of the target user can be determined based on semantic analysis (the first emotional indicator corresponds to an angry emotional indicator if the interactive content is complaint content, or corresponds to a happy emotional indicator if the interactive content is prize claim content). For another example, when the input data of the target user is in an audio format, the first emotional indicator of the target user can be determined based on voiceprint feature analysis.

A corresponding second emotional indicator is then determined based on the first emotional indicator that reflects the emotion of the target user. Here, the second emotional indicator can be considered as a response to the first emotional indicator. For example, if the first emotional indicator corresponds to an anger emotion, the second emotional indicator corresponds to an apology emotion.

The additional animation effect of the virtual life image for making an emotional response to the target user is then generated based on the second emotional indicator. For example, if the second emotional indicator corresponds to an apology emotion, the additional virtual interactive animation can include but is not limited to an animation effect with an apology action.

In practice, in the embodiments of the present specification, a mapping relationship between different emotional indicators and additional virtual interactive animations can be predetermined. After the second emotional indicator is determined, the corresponding additional virtual interactive animation can be directly matched based on the mapping relationship.

Similarly, to achieve a deeper reasoning, association, and memory capability in the human-machine interaction, the additional virtual interactive animation can be generated by using a deep learning technology in the embodiments of the present specification. That is, in this step, feature extraction is performed on the cognitive data for the target user based on at least one feature dimension (for example, an emotional feature dimension, a body movement feature dimension, a facial feature dimension, and voiceprint feature dimension) predetermined for user perception, to obtain a cognitive feature of the target user. The obtained cognitive feature of the target user then is input to a predetermined additional virtual image generation model, to obtain the additional virtual interactive animation.

The additional virtual image generation model is obtained through training based on a cognitive feature of a sample user and a basic animation effect of a virtual life image marked by the sample user (the cognitive feature of the sample user has the same feature dimension as the cognitive feature of the target user), and has a function of associating the input response content with the additional animation effect of the virtual life image and categorizing the input response content and the additional animation effect of the virtual life image.

In practice, the virtual life image can include additional virtual interactive animations of a plurality of parts. The additional virtual interactive animation of each part can correspond to at least one additional virtual image generation model responsible for rendering the animation effect.

S1063. Synthesize the basic virtual interactive animation and the additional virtual interactive animation, to generate the virtual interactive animation.

Here, methods for synthesizing the basic virtual interactive animation and the additional virtual interactive animation are not specifically limited in the present specification. The basic virtual interactive animation and the additional virtual interactive animation can be simultaneously or sequentially displayed.

It should be understood that if the virtual interactive animation is generated by using the deep learning technology in the method in the embodiments of the present specification, some feedback from users on virtual interactive animations can be collected when the solution is put into practice, and a virtual interactive animation that the users are not satisfied with is marked based on the feedback. During subsequent model training, the marked virtual interactive animation that the users are not satisfied with and corresponding parameters can be used as sample training data to optimize the model. Clearly, this process can be automatically performed based on a computer program, so that a virtual life can acquire a self-evolution capability.

It can be seen from the previously described content that in the method in the embodiments of the present specification, perception analysis is performed on a user in a human-machine interaction process, to obtain cognitive data for the user, and response content for the user is further based on the cognitive data. In addition, a virtual interactive animation that includes a virtual life image is dynamically generated based on the cognitive data and the response content for the user, to assist in human-machine interaction. The entire solution enables a virtual robot to acquire the capability of perception, reasoning and analysis, cognition, and empathy expression, to implement a more real and natural human-machine interaction. As such, better user experience can be achieved.

Further, in addition to outputting the virtual interactive animation to the user, the method in the embodiments of the present specification can further include: feeding back empathic response content in a voice mode based on the emotion of the target user when the target user performs the human-machine interaction.

That is, after the first emotional indicator is obtained by analyzing the input data of the target user and the second emotional indicator that matches the first emotional indicator is determined, the human-machine interaction method in the embodiments of the present description can further include the following steps: generating voice data of the response content. Specifically, additional content corresponding to the response content can be determined based on the second emotional indicator and the response content. The additional content can be additional words for expressing the second emotional indicator. For example, additional words corresponding to the apology emotion can be "sorry," "please forgive me," etc. The response content and the additional content are then combined, and then voice conversion is performed to obtain final voice data of the response content.

Then, the voice data of the response content is then processed based on the second emotional indicator, to obtain processed voice data that reflects the second emotional indicator. For example, an audio output tone, audio output volume, an audio output pause time between words, etc. of the voice data of the response content are adjusted.

Finally, the processed voice data is output to the target user through audio. It should be understood that when the processed voice data is output through audio, the emotion corresponding to the second emotional indicator should be reflected. For example, if the second emotional indicator corresponds to a happy emotion, the voice data of the response content should be output through happy emotion audio.

Further, when the virtual interactive animation is a personified image, the output virtual interactive animation that matches the response content can specifically include emotion expression actions that are made by the virtual image and in accordance with the second emotional indicator, for example, being angry, laughing, being shy, being sad, being tearful, and crying. Rendering parameters (for example, skin texture parameters such as skin folds, facial complexion changes, and facial skin color, etc.) of virtual images corresponding to these emotion expression actions can be predetermined.

It can be seen that in the method in the embodiments of the present specification, when the human-machine interaction is performed with the target user, a response can be made in a multi-modal way (including outputting the virtual interactive animation).

Figure 2:
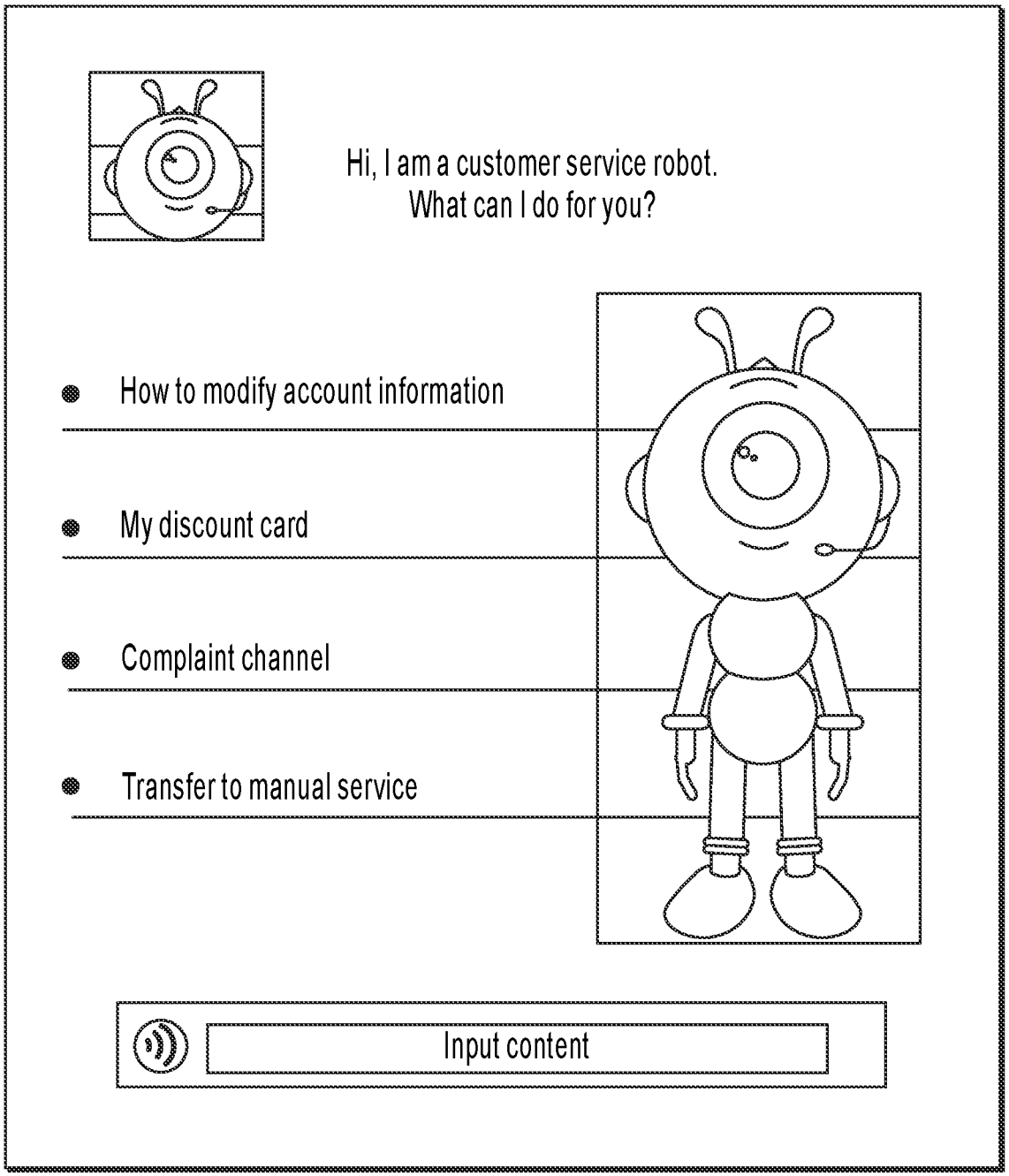
FIG. 2 is a schematic diagram illustrating an example of a human-machine interaction interface in a manual interaction method, according to some embodiments of the present specification.

FIG. 2 is a schematic diagram illustrating an example of applying the human-machine interaction method to a customer service robot, according to some embodiments of the present description. When the target user activates the customer service robot of an application (APP) on a mobile phone device, the human-machine interaction interface is shown in FIG. 2, and a customer service robot wizard is displayed in the lower right area, to assist in the interaction.

After the target user selects any of the options "How to modify account information," "My discount card," "Complaint channel," and "Transfer to manual service" on the human-machine interaction interface, corresponding response content is presented on the human-machine interaction interface, and the customer service robot wizard further makes corresponding actions.

For example, if the target user selects "Transfer to manual service," it indicates that the interaction with the customer service robot will end, and in this case, the customer service robot wizard can wave goodbye to the target user. For another example, if the target user selects "My discount card," the customer service robot wizard can take out a virtual image of the discount card held by the target user from behind to display.

In addition, the mobile phone device can also capture the sight of the target user through scanning by a sensor, and analyze an option currently viewed by the target user on the human-machine interaction interface. In this case, the customer service robot wizard can adaptively make corresponding actions based on the option at the sight of the target user, for example, an introduction action to explain related functions of the option.

In addition, under the human-machine interaction interface shown in FIG. 2, functional options of text input and voice input are further provided, and the target user can flexibly select one of the functional options to send interactive input content to the customer service robot.

Voice input is used as an example. When the target user inputs the interactive content using voice, semantic analysis and voiceprint analysis can be performed on the interactive content. The question content of the target user can be determined through semantic analysis, and an emotional indicator of the target user can be determined based on the question content. Voiceprint analysis is used to directly determine the emotional indicator of the target user. Then, the APP can determine, based on the emotional indicator of the target user, an emotional indicator corresponding to a response of the customer service robot wizard, to perform emotion expression processing on response content corresponding to the question content based on the emotional indicator of the customer service robot wizard, and determine a facial animation effect and a body animation effect corresponding to the emotional indicator of the customer service robot wizard.

Then, the APP plays, through audio, response content obtained after the emotion expression processing is performed, and the customer service robot wizard cooperates to make the corresponding facial animation effect and body animation effect, so that the target user visually thinks it is a deep interaction with the customer service robot wizard. In the human-machine interaction process, the customer service robot wizard shows an empathy capability to some extent in terms of actions, expressions, and voice expressions. Therefore, it is more user-friendly, and a closer relationship with the target user is built.

It should be understood that the application scenario of the customer service robot shown in FIG. 2 is merely an example for description. The method in the embodiments of the present specification can be applied to any human-machine interaction scenario. For example, the method in the embodiments of the present specification can be applied to a multi-person competition scenario. When the target user makes an answer (namely, the input data for performing the human-machine interaction), a virtual interactive animation related to correctness of the answer made by the target user can be displayed on a public large screen or other terminal devices of audiences.

In conclusion, in the method in the embodiments of the present specification, main features of a virtual life are simulated by using artificial intelligence technologies, an interaction with the target user can be implemented in a multi-modal way, and a powerful capability of perceiving visual information, auditory information, voice, etc., and an empathy expression capability achieved through emotion reasoning and analysis can be acquired.

The method in the embodiments of the present specification is described above. It should be understood that appropriate changes can be made without departing from the previously described principle of the present specification, and these changes shall also fall within the protection scope of the embodiments of the present specification. For example, in the method in the embodiments of the present specification, the first emotional indicator corresponding to the target user can be analyzed by capturing facial image data of the target user. Alternatively, the first emotional indicator corresponding to the target user can be analyzed by using electrocardiogram data detected by an intelligent wearable device of the target user.

Figure 3:
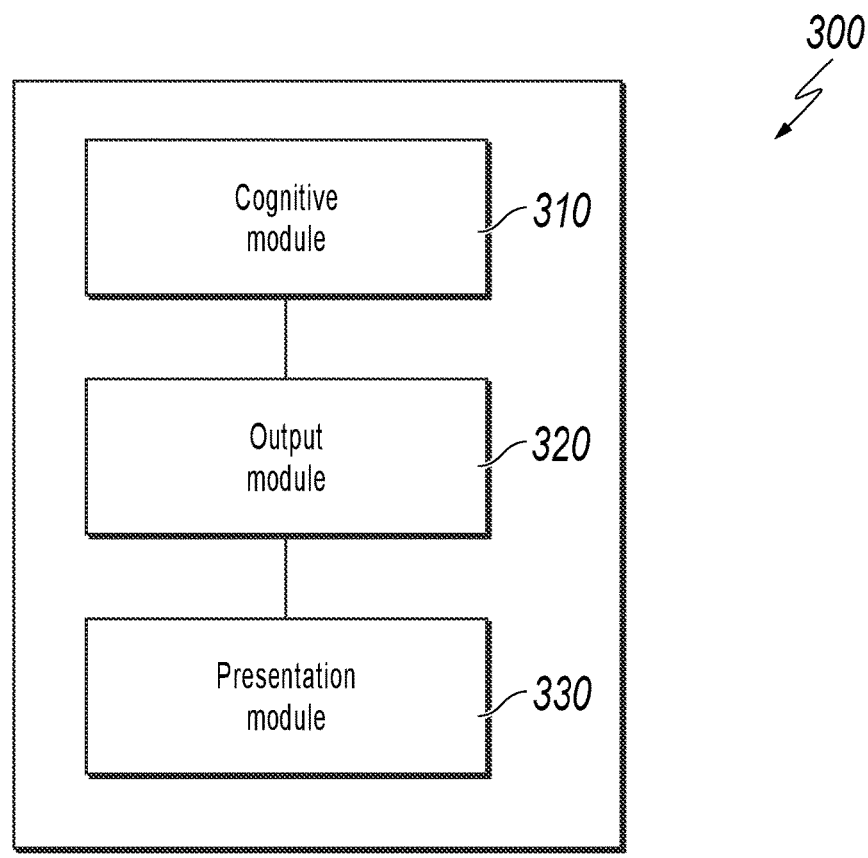
FIG. 3 is a schematic structural diagram illustrating an example of a manual interaction apparatus, according to some embodiments of the present specification.

Corresponding to the human-machine interaction method shown in FIG. 1, embodiments of the present specification further provide a virtual-life-based human-machine interaction apparatus. FIG. 3 is a schematic structural diagram illustrating an example of a human-machine interaction apparatus 300, according to some embodiments of the present specification. The human-machine interaction apparatus 300 includes:

a cognitive module 310, configured to perform perception analysis on a target user who performs a human-machine interaction, to obtain cognitive data for the target user;

an output module 320, configured to output target response content determined based on the cognitive data to the target user; and a presentation module 330, configured to play a virtual interactive animation that includes a virtual life image and is dynamically generated based on the cognitive data and the target response content, where the virtual life image in the virtual interactive animation has an animation effect that matches the human-machine interaction performed with the target user.

The apparatus in the embodiments of the present specification performs perception analysis on a user in a human-machine interaction process, to obtain cognitive data for the user, and further determines response content for the user based on the cognitive data. In addition, a virtual interactive animation that includes a virtual life image is dynamically generated based on the cognitive data and the response content for the user, to assist in human-machine interaction. The entire solution enables a virtual robot to acquire the capability of perception, reasoning and analysis, cognition, and empathy expression, to implement a more real and natural human-machine interaction. As such, better user experience can be achieved.

Optionally, the human-machine interaction apparatus in the embodiments of the present specification further includes an animation determining module. Before the presentation module 330 plays the virtual interactive animation that includes the virtual life image and is dynamically generated based on the cognitive data and the target response content, the animation determining module is configured to generate a basic virtual interactive animation based on the target response content, where the basic virtual interactive animation includes a virtual life image that has a basic animation effect; generate an additional virtual interactive animation based on the cognitive data for the target user, where the additional virtual interactive animation includes a virtual life image that has an additional animation effect; and synthesize the basic virtual interactive animation and the additional virtual interactive animation, to generate the virtual interactive animation.

The cognitive data for the target user includes a first emotional indicator that reflects an emotion of the target user. Correspondingly, the presentation module 330 is configured to generate the additional virtual interactive amination based on the cognitive data for the target user. Specifically, the presentation module 330 is configured to determine a corresponding second emotional indicator based on the first emotional indicator that reflects the emotion of the target user; and generate, based on the second emotional indicator, the additional animation effect of the virtual life image for making an emotional response to the target user.

Optionally, on the basis of the above, the presentation module 330 can be further configured to generate voice data of the response content; process the voice data of the target response content based on the second emotional indicator (for example, adjust an audio output tone, audio output volume, and an audio output pause time between words), to obtain processed voice data that reflects the second emotional indicator; and output the processed voice data to the target user through audio.

Optionally, that the animation determining module is configured to generate the basic virtual interactive animation based on the target response content specifically includes: performing feature extraction on the target response content based on at least one feature dimension predetermined for making a response to a user, to obtain a response feature of the target response content; and inputting the obtained response feature of the target response content to a predetermined basic virtual image generation model, to obtain the basic virtual interactive animation, where the basic virtual image generation model is obtained through training based on a response feature in sample response content and a basic animation effect of a virtual life image marked by using the sample response content, and the response feature in the sample response content has the same feature dimension as the response feature extracted from the target response content.

Optionally, that the animation determining module is configured to generate the additional virtual interactive animation based on the cognitive data for the target user specifically includes: performing feature extraction on the cognitive data for the target user based on at least one feature dimension predetermined for user perception, to obtain a cognitive feature of the target user; and inputting the obtained cognitive feature of the target user to a predetermined additional virtual image generation model, to obtain the additional virtual interactive animation, where the additional virtual image generation model is obtained through training based on a cognitive feature of a sample user and a basic animation effect of a virtual life image marked by the sample user, and the cognitive feature of the sample user has the same feature dimension as the cognitive feature of the target user.

Optionally, that the cognitive module 310 is configured to perform perception analysis on the target user who performs the human-machine interaction specifically includes: performing perception analysis of at least two types of modal information on the target user who performs the human-machine interaction, to obtain cognitive data about the at least two types of modal information for the target user, where the perception analysis of the at least two types of modal information includes at least one of perception analysis based on visual information, perception analysis based on auditory information, and perception analysis based on human-machine interaction input information.

In conclusion, the apparatus in the embodiments of the present specification simulates main features of a virtual life by using artificial intelligence technologies, can interact with the target user in a multi-modal way, and acquires a powerful capability of perceiving visual information, auditory information, voice, etc., and an empathy expression capability achieved through emotion reasoning and analysis.

Obviously, the human-machine interaction apparatus in the embodiments of the present specification can perform the human-machine interaction method shown in FIG. 1, and therefore can implement the functions of the human-machine interaction method implemented in FIG. 1 and FIG. 2. As principles are the same, details are omitted here for simplicity.

Figure 4:
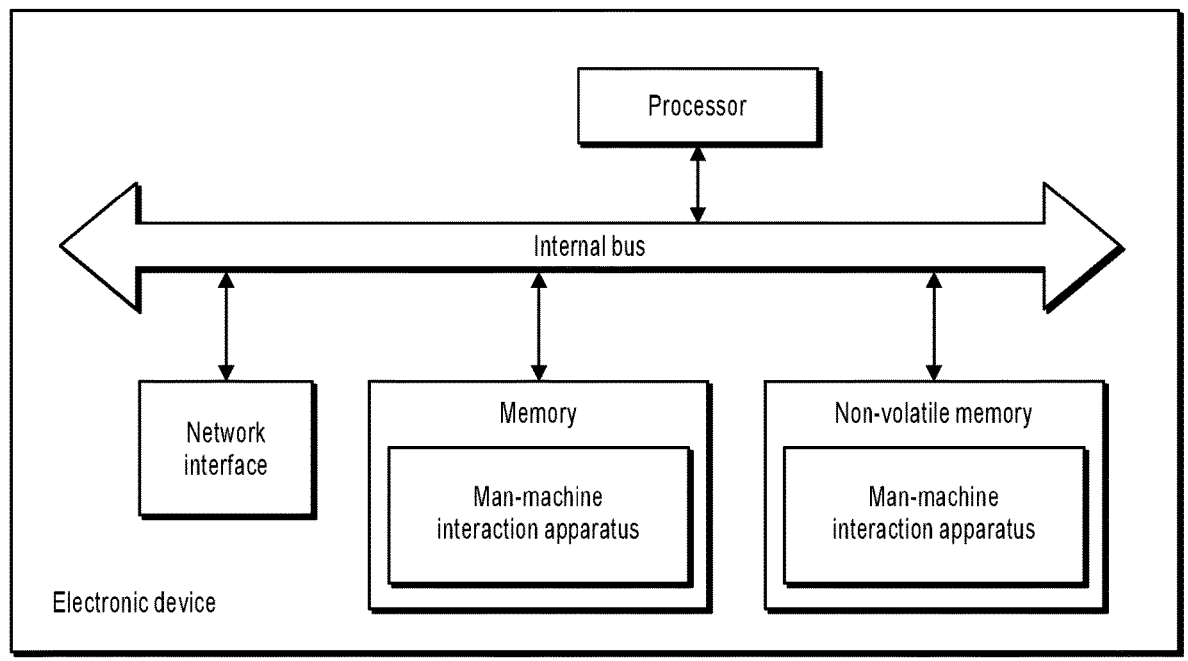
FIG. 4 is a schematic structural diagram illustrating an example of an electronic device, according to some embodiments of the present specification.

FIG. 4 is a schematic structural diagram illustrating an example of an electronic device, according to some embodiments of the present specification. Referring to FIG. 4, at the hardware level, the electronic device includes a processor, and optionally, further includes an internal bus, a network interface, and a memory. The memory can include a storage such as a high-speed random access memory (RAM), and can further include a nonvolatile memory such as at least one magnetic disk memory. Certainly, the electronic device may further include hardware needed for other services.

The processor, the network interface, and the memory can be connected to each other through the internal bus. The internal bus can be an industry standard architecture (ISA) bus, a peripheral component interconnect (PCI) bus, an extended industry standard architecture (EISA) bus, etc. The bus can be classified into an address bus, a data bus, a control bus, etc. For ease of representation, only one bidirectional arrow is shown in FIG. 4, but it does not indicate that there is only one bus or one type of bus.

The memory is configured to store a program. Specifically, the program can include program code, and the program code includes computer operation instructions. The memory can include the storage and the nonvolatile memory, and provide instructions and data for the processor.

The processor reads the corresponding computer program from the nonvolatile memory into the storage, and runs the computer program to logically form the human-machine interaction apparatus. The processor is configured to execute the program stored in the memory, and is specifically configured to perform the following operations: performing perception analysis on a target user who performs a human-machine interaction, to obtain cognitive data for the target user; outputting target response content determined based on the cognitive data to the target user; and playing a virtual interactive animation that includes a virtual life image and is dynamically generated based on the cognitive data and the target response content, where the virtual life image in the virtual interactive animation has an animation effect that matches the human-machine interaction performed with the target user.

The electronic device in the embodiments of the present specification performs perception analysis on a user in a human-machine interaction process, to obtain cognitive data for the user, and further determines response content for the user based on the cognitive data. In addition, a virtual interactive animation that includes a virtual life image is dynamically generated based on the cognitive data and the response content for the user, to assist in human-machine interaction. The entire solution enables a virtual robot to acquire the capability of perception, reasoning and analysis, cognition, and empathy expression, to implement a more real and natural human-machine interaction. As such, better user experience can be achieved.

The human-machine interaction method disclosed above in the embodiment shown in FIG. 1 of the present specification can be applied to or implemented by a processor. The processor can be an integrated circuit chip with a signal processing capability. In implementation, the steps of the previously described method can be completed by an integrated logic circuit of hardware in the processor or instructions in the form of software. The processor can be a general-purpose processor, including a central processing unit (CPU), a network processor (NP), etc. Alternatively, the processor can be a digital signal processor (DSP), an application-specific integrated circuit (ASIC), a field programmable gate array (FPGA), other programmable logic devices, a discrete gate, a transistor logic device, or a discrete hardware component. The methods, steps, and logical block diagrams disclosed in the embodiments of the present specification can be implemented or performed. The general-purpose processor can be a microprocessor, or the processor can be any conventional processor, etc. The steps of the method disclosed with reference to the embodiments of the present specification can be directly performed by a hardware decoding processor, or performed by a combination of hardware in a decoding processor and software modules. The software module can be located in a storage medium mature in the art, for example, a random access memory, a flash memory, a read-only memory, a programmable read-only memory, an electrically erasable programmable memory, or a register. The storage medium is located in the memory, and the processor reads information in the memory and completes the steps of the method in combination with the hardware.

It should be understood that the electronic device in the embodiments of the present specification can implement the functions of the previously described apparatus in the embodiments shown in FIG. 1 and FIG. 2. Details are omitted for simplicity in the present specification.

Certainly, implementations other than the software implementation are not excluded for the electronic device in the present specification, for example, a logic device or a combination of software and hardware. That is, an execution body of the following processing procedures is not limited to a logic unit, and can be hardware or a logic device.

Further, embodiments of the present specification provide a computer-readable storage medium. The computer-readable storage medium stores one or more programs, and the one or more programs include instructions. When the instructions are executed by a portable electronic device that includes a plurality of application programs, the portable electronic device is enabled to perform the method in the embodiment shown in FIG. 1, and is specifically configured to perform the following method: performing perception analysis on a target user who performs a human-machine interaction, to obtain cognitive data for the target user; outputting target response content determined based on the cognitive data to the target user; and playing a virtual interactive animation that includes a virtual life image and is dynamically generated based on the cognitive data and the target response content, where the virtual life image in the virtual interactive animation has an animation effect that matches the human-machine interaction performed with the target user.

It should be understood that when the previously described instructions are executed by the portable electronic device that includes a plurality of application programs, the human-machine interaction method and apparatus described above are enabled to implement the functions of the embodiments shown in FIG. 1 and FIG. 2. Details are omitted for simplicity in the present specification.

A person skilled in the art should understand that the embodiments of the present specification can be provided as methods, systems, or computer program products. Therefore, the present specification can use a form of hardware only embodiments, software only embodiments, or embodiments with a combination of software and hardware. In addition, the present specification can use a form of a computer program product that is implemented on one or more computer-usable storage media (including but not limited to a disk memory, a CD-ROM, an optical memory, etc.) that include computer-usable program code.

Specific embodiments of the present specification are described above. Other embodiments fall within the scope of the appended claims. In some cases, the actions or steps described in the claims can be performed in a sequence different from that in the embodiments, and the desired results can still be achieved. In addition, the process described in the accompanying drawings does not necessarily require a particular sequence or sequential sequence shown to achieve the desired results. In some implementations, multi-tasking and parallel processing can be advantageous.

The previous descriptions are merely embodiments of the present specification, and are not intended to limit the present specification. For a person skilled in the art, the present specification can have various modifications and changes. Any modifications, equivalent replacements, and improvements made within the spirit and the principle of the present specification shall fall within the scope of the claims in the present specification. In addition, all other embodiments obtained by a person of ordinary skill in the art without creative efforts shall fall within the protection scope of the present specification.

What is claimed is:

1. A computer-implemented method, comprising:
in response to a human-machine interaction from a target user, obtaining cognitive data for the target user by performing perception analysis on the target user;
identifying target response content based on the cognitive data;
sending the target response content to the target user;
generating a basic virtual interactive animation based on the target response content, wherein generating the basic virtual interactive animation based on the target response content comprises:
obtaining a first response feature of the target response content by performing feature extraction on the target response content based on at least one feature dimension predetermined for the target user; and
obtaining the basic virtual interactive animation by inputting the first response feature of the target response content to a predetermined basic virtual image generation model, wherein the predetermined basic virtual image generation model is obtained by training a basic animation effect of a virtual life image marked by sample response content and based on a second response feature in the sample response content, wherein the second response feature in the sample response content has a same feature dimension as the first response feature extracted from the target response content;
generating an additional virtual interactive animation based on the cognitive data, wherein the cognitive data comprises a first emotional indicator that indicates an emotion of the target user, wherein generating the additional virtual interactive animation comprises:
determining a second emotional indicator based on the first emotional indicator, wherein the second emotional indicator indicates a responsive emotion to the emotion of the target user that is indicated by the first emotional indicator; and
generating the additional virtual interactive animation based on the second emotional indicator; and
dynamically generating, based on the basic virtual interactive animation and the additional virtual interactive animation, a virtual interactive animation that comprises a virtual life image, wherein the virtual life image has an animation effect that matches the human-machine interaction performed by the target user.

2. The computer-implemented method of claim 1, wherein:
the basic virtual interactive animation comprises a first virtual life image that has a basic animation effect; and
the additional virtual interactive animation comprises a second virtual life image that has an additional animation effect.

3. The computer-implemented method of claim 2, wherein generating the additional virtual interactive animation based on the cognitive data comprises:
obtaining a first cognitive feature of the target user by performing feature extraction on the cognitive data for the target user based on at least one feature dimension predetermined for the target user; and
obtaining the additional virtual interactive animation by inputting the first cognitive feature of the target user to a predetermined additional virtual image generation model, wherein the predetermined additional virtual image generation model is obtained by training a basic animation effect of a virtual life image marked by a sample user and based on a second cognitive feature of the sample user, and wherein the second cognitive feature of the sample user has a same feature dimension as the first cognitive feature of the target user.

4. The computer-implemented method of claim 1, wherein sending the target response content to the target user comprises:
generating voice data of the target response content;
obtaining processed voice data by processing the voice data of the target response content based on the second emotional indicator; and
sending the processed voice data to the target user in audio form.

5. The computer-implemented method of claim 4, wherein processing the voice data of the target response content based on the second emotional indicator comprises:
performing at least one of the following adjustments to the voice data of the target response content based on the second emotional indicator: an audio output tone, audio output volume, or an audio output pause time between words.

6. The computer-implemented method of claim 1, wherein obtaining the cognitive data for the target user by performing perception analysis on the target user comprises:
performing perception analysis of at least two types of modal information on the target user; and
obtaining cognitive data for the at least two types of modal information for the target user, wherein the perception analysis of the at least two types of modal information comprises at least one of perception analysis based on visual information, perception analysis based on auditory information, or perception analysis based on human-machine interaction input information.

7. A non-transitory, computer-readable medium storing one or more instructions executable by a computer system to perform operations comprising:
in response to a human-machine interaction from a target user, obtaining cognitive data for the target user by performing perception analysis on the target user;
identifying target response content based on the cognitive data;
sending the target response content to the target user;
generating a basic virtual interactive animation based on the target response content, wherein generating the basic virtual interactive animation based on the target response content comprises:
obtaining a first response feature of the target response content by performing feature extraction on the target response content based on at least one feature dimension predetermined for the target user; and
obtaining the basic virtual interactive animation by inputting the first response feature of the target response content to a predetermined basic virtual image generation model, wherein the predetermined basic virtual image generation model is obtained by training a basic animation effect of a virtual life image marked by sample response content and based on a second response feature in the sample response content, wherein the second response feature in the sample response content has a same feature dimension as the first response feature extracted from the target response content;

generating an additional virtual interactive animation based on the cognitive data, wherein the cognitive data comprises a first emotional indicator that indicates an emotion of the target user, wherein generating the additional virtual interactive animation comprises:

determining a second emotional indicator based on the first emotional indicator, wherein the second emotional indicator indicates a responsive emotion to the emotion of the target user that is indicated by the first emotional indicator; and generating the additional virtual interactive animation based on the second emotional indicator; and dynamically generating, based on the basic virtual interactive animation and the additional virtual interactive animation, a virtual interactive animation that comprises a virtual life image, wherein the virtual life image has an animation effect that matches the human-machine interaction performed by the target user.

8. The non-transitory, computer-readable medium of claim 7, wherein:

the basic virtual interactive animation comprises a first virtual life image that has a basic animation effect; and the additional virtual interactive animation comprises a second virtual life image that has an additional animation effect.

9. The non-transitory, computer-readable medium of claim 8, wherein generating the additional virtual interactive animation based on the cognitive data comprises:

obtaining a first cognitive feature of the target user by performing feature extraction on the cognitive data for the target user based on at least one feature dimension predetermined for the target user; and obtaining the additional virtual interactive animation by inputting the first cognitive feature of the target user to a predetermined additional virtual image generation model, wherein the predetermined additional virtual image generation model is obtained by training a basic animation effect of a virtual life image marked by a sample user and based on a second cognitive feature of the sample user, and wherein the second cognitive feature of the sample user has a same feature dimension as the first cognitive feature of the target user.

10. The non-transitory, computer-readable medium of claim 7, wherein sending the target response content to the target user comprises:

generating voice data of the target response content;

obtaining processed voice data by processing the voice data of the target response content based on the second emotional indicator; and sending the processed voice data to the target user in audio form.

11. The non-transitory, computer-readable medium of claim 10, wherein processing the voice data of the target response content based on the second emotional indicator comprises:

performing at least one of the following adjustments to the voice data of the target response content based on the second emotional indicator: an audio output tone, audio output volume, or an audio output pause time between words.

12. The non-transitory, computer-readable medium of claim 7, wherein obtaining the cognitive data for the target user by performing perception analysis on the target user comprises:

performing perception analysis of at least two types of modal information on the target user; and obtaining cognitive data for the at least two types of modal information for the target user, wherein the perception analysis of the at least two types of modal information comprises at least one of perception analysis based on visual information, perception analysis based on auditory information, or perception analysis based on human-machine interaction input information.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

in response to a human-machine interaction from a target user, obtaining cognitive data for the target user by performing perception analysis on the target user;

identifying target response content based on the cognitive data;

sending the target response content to the target user;

generating a basic virtual interactive animation based on the target response content, wherein generating the basic virtual interactive animation based on the target response content comprises:

obtaining a first response feature of the target response content by performing feature extraction on the target response content based on at least one feature dimension predetermined for the target user; and obtaining the basic virtual interactive animation by inputting the first response feature of the target response content to a predetermined basic virtual image generation model, wherein the predetermined basic virtual image generation model is obtained by training a basic animation effect of a virtual life image marked by sample response content and based on a second response feature in the sample response content, wherein the second response feature in the sample response content has a same feature dimension as the first response feature extracted from the target response content;

generating an additional virtual interactive animation based on the cognitive data, wherein the cognitive data comprises a first emotional indicator that indicates an emotion of the target user, wherein generating the additional virtual interactive animation comprises:

determining a second emotional indicator based on the first emotional indicator, wherein the second emotional indicator indicates a responsive emotion to the emotion of the target user that is indicated by the first emotional indicator; and generating the additional virtual interactive animation based on the second emotional indicator; and dynamically generating, based on the basic virtual interactive animation and the additional virtual interactive animation, a virtual interactive animation that comprises a virtual life image, wherein the virtual life image has an animation effect that matches the human-machine interaction performed by the target user.

14. The computer-implemented system of claim 13, wherein:
the basic virtual interactive animation comprises a first virtual life image that has a basic animation effect; and
the additional virtual interactive animation comprises a second virtual life image that has an additional animation effect.

15. The computer-implemented system of claim 14, wherein generating the additional virtual interactive animation based on the cognitive data comprises:
obtaining a first cognitive feature of the target user by performing feature extraction on the cognitive data for the target user based on at least one feature dimension predetermined for the target user; and
obtaining the additional virtual interactive animation by inputting the first cognitive feature of the target user to a predetermined additional virtual image generation model, wherein the predetermined additional virtual image generation model is obtained by training a basic animation effect of a virtual life image marked by a sample user and based on a second cognitive feature of the sample user, and wherein the second cognitive feature of the sample user has a same feature dimension as the first cognitive feature of the target user.

* * * * *